US010354435B2

(12) United States Patent
Thiebaud et al.

(10) Patent No.: US 10,354,435 B2
(45) Date of Patent: Jul. 16, 2019

(54) TRIDIMENSIONAL RENDERING WITH ADJUSTABLE DISPARITY DIRECTION (71) Applicant: INTERDIGITAL CE PATENT HOLDINGS, Paris (FR)

(72) Inventors: Sylvain Thiebaud, Noyal sur Vilaine (FR); Didier Doyen, La bouexiere (FR); Philippe Robert, Rennes (FR)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 0 days.

(21) Appl. No.: 15/389,394

(22) Filed: Dec. 22, 2016

(65) Prior Publication Data

US 2017/0186220 A1 Jun. 29, 2017

(30) Foreign Application Priority Data

Dec. 23, 2015 (EP) .................................... 15307131

(51) Int. Cl.
*G06T 15/20* (2011.01)
*G06F 3/01* (2006.01)
*G06T 19/20* (2011.01)
*H04N 13/305* (2018.01)
*H04N 13/378* (2018.01)
*H04N 13/111* (2018.01)
*H04N 13/128* (2018.01)

(52) U.S. Cl.
CPC .............. *G06T 15/20* (2013.01); *G06F 3/013* (2013.01); *G06T 19/20* (2013.01); *H04N 13/111* (2018.05); *H04N 13/128* (2018.05); *H04N 13/305* (2018.05); *H04N 13/378* (2018.05)

(58) Field of Classification Search
CPC ......... G06F 3/013; G06T 15/20; G06T 19/20; G06T 7/77; G06T 5/002; G06T 7/13; H04N 13/0022; H04N 13/0003; G05B 19/4142; G05B 2219/33027; G05B 2219/33032
USPC ......................................................... 345/419
See application file for complete search history.

(56) References Cited

U.S. PATENT DOCUMENTS 6,351,262 B1   2/2002   Edmark
8,331,023 B2  12/2012   Wu et al.
8,497,934 B2   7/2013   Milnes et al.
(Continued)

FOREIGN PATENT DOCUMENTS

EP         2835972      2/2015
EP         2876879      5/2015
(Continued)

OTHER PUBLICATIONS

Zhang et al., "Visual Pertinent 2D-to-3D Video Conversion by Multi-Cue Fusion", IEEE 18th International Conference on Image Processing (ICIP), Brussels, Belgium, Sep. 11, 2011, pp. 909-912.

*Primary Examiner* — Robert J Craddock
(74) *Attorney, Agent, or Firm* — Lily Neff (57) ABSTRACT The disclosure pertains a method for determining a rendered tridimensional content intended to a viewer. The method includes inputting a reference content comprising at least a reference view, inputting at least one information related to the viewer's eyes orientation relatively to a reference axis of a display device, and determining a rendered view as a function of the reference view, and the information related to the viewer's eyes orientation relatively to the reference axis of the display device.

14 Claims, 7 Drawing Sheets

(56) References Cited

U.S. PATENT DOCUMENTS

| | | | |
|---|---|---|---|
| 2010/0215251 A1* | 8/2010 | Klein Gunnewiek | ........................ H04N 13/0022 382/154 |
| 2011/0228051 A1* | 9/2011 | Dedeoglu | .......... H04N 13/0022 348/46 |
| 2012/0139906 A1* | 6/2012 | Zhang | .................. H04N 13/004 345/419 |
| 2012/0169724 A1 | 7/2012 | Park et al. | |
| 2013/0076749 A1 | 3/2013 | Maeda et al. | |
| 2014/0098201 A1 | 4/2014 | Park et al. | |
| 2014/0146148 A1 | 5/2014 | Maciocci | |
| 2016/0378182 A1* | 12/2016 | Nguyen | .................. G06F 3/012 345/156 |

FOREIGN PATENT DOCUMENTS

| | | |
|---|---|---|
| WO | WO98/49667 | 11/1998 |
| WO | WO2013030002 | 3/2013 |

* cited by examiner

TRIDIMENSIONAL RENDERING WITH ADJUSTABLE DISPARITY DIRECTION

1. REFERENCE TO RELATED EUROPEAN APPLICATION

This application claims priority from European Application No. 15307131.1, entitled "Tridimensional Rendering With Adjustable Disparity Direction," filed on Dec. 23, 2015, the contents of which are hereby incorporated by reference in its entirety.

2. TECHNICAL FIELD

The field of the disclosure relates to tridimensional (3D) rendering. More specifically, the disclosure relates to a method for adapting rendered views as a function of information on the orientation of a user's head, relatively to a 3D display device.

3. BACKGROUND ART

This section is intended to introduce the reader to various aspects of art, which may be related to various aspects of the present disclosure that are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

In spite of the numerous improvements made recently in this technological field, 3D rendering remains as the object of intensive researches, with many issues still unsolved. Acquisition systems of background art are usually composed of 3D camera rigs where the cameras are aligned horizontally (or considered as equivalent through the implementation of mirrors). As a consequence, only the horizontal disparity between the 3D views can be evaluated.

Figure 1:
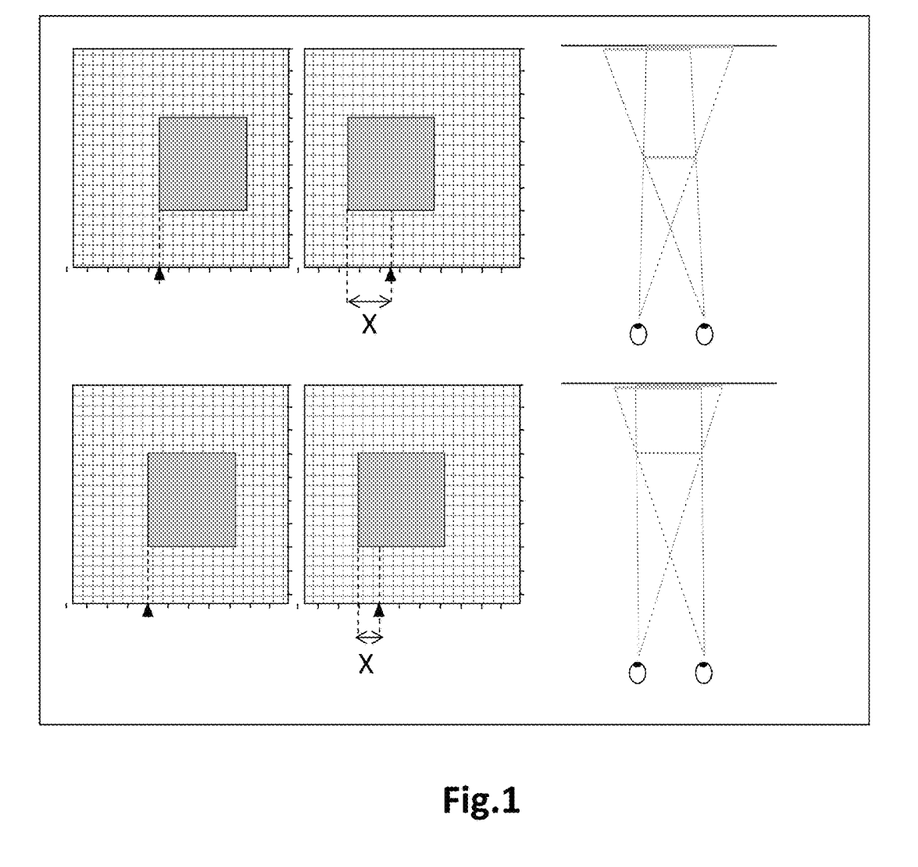
FIG. 1 is a diagram illustrating a view synthesis for horizontal eyes, as known from the art.

Some algorithms of view interpolation have been developed, especially to adjust the level of 3D. This interpolation is performed exclusively in the horizontal direction, as illustrated by FIG. 1. The input format required to perform this operation must include the horizontal disparity (or depth) of the view. This format can be for instance multi-view+depth: the left and right 3D views, and the disparity map coding the disparity per pixel between these views.

Figure 2:
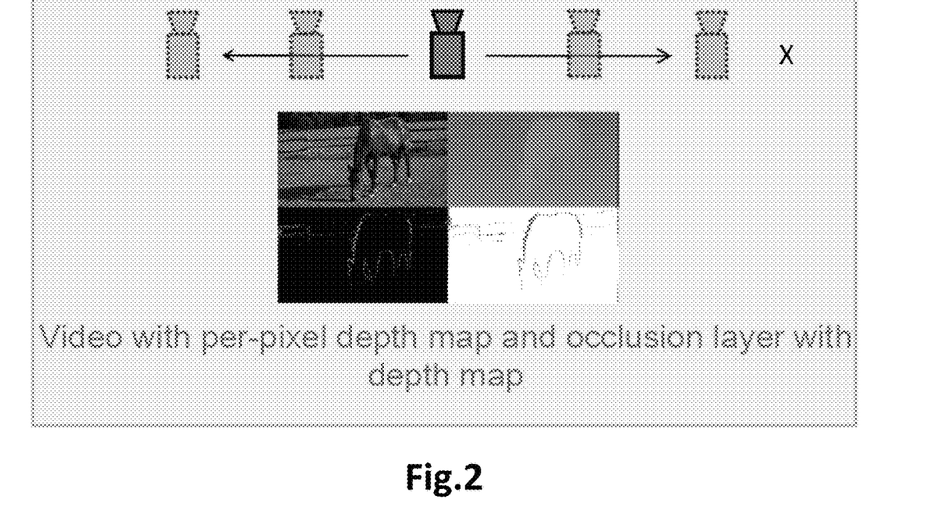
FIG. 2 is another diagram illustrating a view synthesis for horizontal eyes, as known from the art.

Philips/Dimenco proposed a format named "Layered Depth video—LDV" (cf. FIG. 2). This format includes a video view corresponding to a central camera, a depth map associated to this view, an occlusion layer and its depth map. This format is one of the input format of the Dimenco multi-view monitors. Thanks to this information, the monitor can interpolate peripheral views around the central view. These peripheral views correspond to the views, as they would be acquired by peripheral cameras, horizontally shifted (dotted line cameras in FIG. 2).

Figure 3:
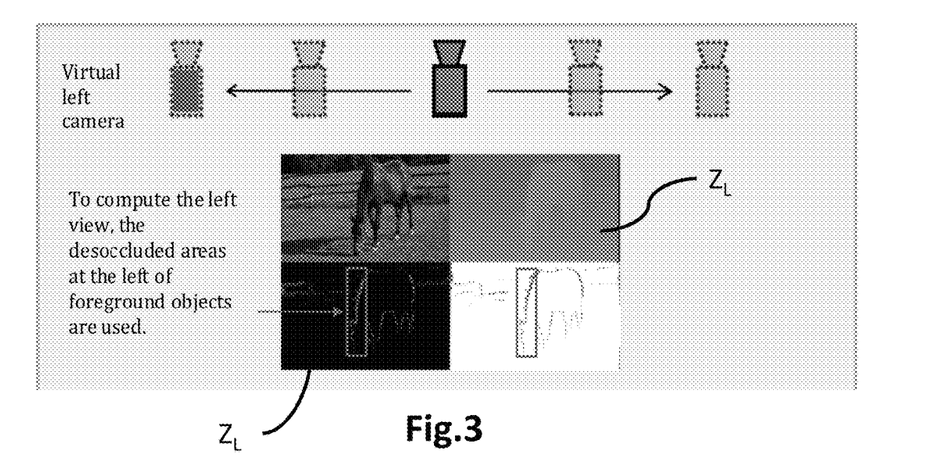
FIG. 3 is a diagram illustrating a view reconstruction from LDV format, as known from the art.

Some areas behind the foreground objects are occluded in the central view. These areas will be disoccluded by the peripheral view interpolation. These background areas are reconstructed thanks to the occlusion layer and its depth map. For instance, the view corresponding to the virtual left dotted line camera will be reconstructed with the background information at the left of the horse (FIG. 3).

The position range of the interpolated view (corresponding to a distance of the virtual camera from the central camera) depends on the amount of information in the occlusion layer. The more information available behind the foreground object, the further the interpolated view from the central view can be.

In this example of prior art, since only horizontal information are available, only horizontal view interpolation can be performed. Therefore, the 3D effect can only be satisfactory rendered if the eyes axis is horizontal.

It would hence be desirable to provide a method for 3D rendering, which shows improvements over the background art.

4. SUMMARY OF THE DISCLOSURE

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In one particular embodiment of the technique, a method for determining a rendered tridimensional content intended to a viewer is disclosed, said method comprising:
 inputting a reference content comprising a reference view,
 inputting at least one information related to the viewer's eyes orientation relatively to a reference axis of a display device,
 determining a rendered view as a function of the reference view and the information related to the viewer's eyes orientation relatively to the reference axis of the display device.

In the following description, the terms "reference view" refer to a fixed view, which is used as a reference to determine the "rendered view". Such a "rendered view" may be determined either by a process of calculation, or by a process of selection. Thus, the terms "rendered view" refer to a view resulting from this determination step. The "rendered tridimensional content" is the combination of both the reference view and the rendered view, which, by stereoscopy, provides the viewer with a tridimensional view of an observed scene. In one embodiment of the disclosure, the reference view corresponds to the view from the viewer's left eye (also referred to as "left view"), while the rendered view to be determined corresponds to the view from the viewer's right eye (also referred to as "right view"). One skilled in the art will understand that in another embodiment, such correspondence may be reverted, the viewer's right eye then seeing the reference view. In another embodiment, such views may also be allocated to any object, for instance a sensor mounted on an unmanned vehicle and connected at distance with an operator through an interface unit.

A method according to the present disclosure relies on different approach of considering an observed scene by adapting the tridimensional rendered vision of this scene according to the viewer's eyes orientation relatively to a reference axis of the display device. In this way, when the viewer tilts his head, the implementation of the present methods allows determining an adapted rendered content to be addressed to the viewer's eyes in order to create the illusion of observing a scene in three dimensions. The direction of the viewer's eye axis that is considered is in fact the projection of this axis onto the display screen that is compared to the reference axis of the display device.

In one embodiment, the method comprises determining a disparity direction as a function of the information related to the viewer's eyes orientation relatively to the reference axis of the display device, and determining the rendered view is also a function of the disparity direction.

In one embodiment, the reference content comprises a depth map depicting depth in the reference view, or information on the disparity between at least one given view and the reference view, or the at least one given view, and the step of determining the rendered view is also a function of the depth map or the information on disparity, or the at least one given view.

The terms "depth map" refer to an image that contains information relating to the distance of the observed scene from a certain viewpoint (in present case, either the reference view or the rendered view). The term "disparity" or "parallax" refers to the shift on a display device (or a photo sensor) between corresponding pixels on two different views. As known from the prior art, it is possible to switch between a disparity map and a depth map, both maps allowing for depth perception in stereo images. The terms "given view" refer to a view depicting a same object of a scene as the reference view, but from another point of view.

When facing the expression "a reference content comprising: a reference view [ . . . ], a depth map [ . . . ], information on disparity [ . . . ]", one skilled in the art that understands that these different data are either parts of the reference content as inputted, or information that can be obviously deducted or extracted from the reference content based on a method known from the background art and/or the general knowledge of a person skilled in the art. In the same expression, the term "comprising" may therefore be replaced by the expression "including, or from which the following data can be extracted". For instance, one skilled in the art will obviously be able to extract, from a reference content comprising a plurality of views, information on the disparity between at least two of these views.

Such a method features a low computing complexity, by limiting the size of the input data, while preserving a satisfactory rendered content quality, thanks to the exploitation of the depth map or the information on disparity, or the at least one given view.

In one embodiment, the reference content comprises occlusion information on a hidden portion of the reference view along a tilted axis forming a certain angle with the reference axis of the display device, and the step of determining the rendered view is also a function of the occlusion information.

The terms "occlusion information" refer to information about some portions of a scene that are hidden or occluded from a certain point of view e.g. in the reference view, but that may be revealed when moving according to this object in one direction, or another. Thus, such a method stands out of the background art by considering information along another direction than the reference axis of the display device, and by exploiting them, in combination with information about the viewer's eyes orientation, to determine an appropriate rendered tridimensional content. Such a method also features a low computing complexity, by limiting the size of the input data, while preserving a satisfactory rendered content quality, thanks to the exploitation of the occlusion information.

In one embodiment, the occlusion information pertain to a hidden portion of the reference view along at least two tilted axis forming an angle with the reference axis of the display device.

The quality of the perceived 3D effect generally increases with the number of directions considered. Therefore, the addition of directions considered by the occlusion information allows improving the quality of the rendered view to be determined.

In one embodiment, determining consists in interpolating as a function of the reference view, the depth map or the information on disparity, the occlusion information, and the information related to the viewer's eyes orientation relatively to the reference axis of the display device.

Contrary to the teachings of the prior art, a method according to this embodiment of the disclosure only requires a single reference view, which allows reducing the size of the inputted reference content and features a better interpolation quality, while reducing the complexity of the method.

In one embodiment, interpolating comprises:
determining a depth or a disparity map of the rendered view from the reference view depth map,
determining a hidden portion of the rendered view based on the occlusion information.

Such a method allows preserving a satisfactory rendered content quality, thanks to the exploitation of the occlusion information.

In another embodiment, determining the hidden portion of the rendered view consists in interpolating the occluded areas of the reference view, thanks to in-painting technics. Occlusion information are therefore not required to run such a method.

In one embodiment, interpolating further comprises determining the color of each pixel of the rendered view based on the color of the corresponding pixel in the reference view.

In one embodiment, the reference view corresponds to the view from the viewer's left eye or right eye, and the rendered view to be determined corresponds to the view from the viewer's opposite eye, and the position $(u_R, v_R)$ in the rendered view of an object located at a position $(u_L, v_L)$ in the reference view is given by:

$$u_R = u_L - \frac{f^u B_{L/R}^u}{Z_L(u_L, v_L)}$$

$$v_R = v_L - \frac{f^v B_{L/R}^v}{Z_L(u_L, v_L)}$$

Where $B_{L/R}^u$ and $B_{L/R}^v$ are the horizontal and the vertical components of a baseline vector, $B_{L/R}^u$ being equal to $B*\cos\theta$ and $B_{L/R}^v$ being equal to $B*\sin\theta$, B being the distance between the viewer's eyes and θ being the viewer's eye orientation, where $Z_L(u_L, v_L)$ corresponds to the depth value at the position $(u_L, v_L)$, and where $f^u$ and $f^v$ are respectively the products of the focal length by the horizontal and the vertical density on a sensor adapted to sense the viewer's eyes orientation.

In one embodiment, the reference content comprises light-field data.

Such light-field data comprise or allow the extraction of the reference view, allow the extraction or the determination of the associated depth map and can contain several views from different directions and/or an occlusion map depicting hidden portions of the foreground object in several directions. In another embodiment, the occluded data associated to the reference view, may be extracted from a plurality of given views having different disparity directions. The quality of the perceived 3D effect is therefore significantly improved.

In one embodiment, the reference content comprises a plurality of given views and determining consists in selecting among the given views the rendered view, as a function of the reference content and the information related to the viewer's eyes orientation relatively to the reference axis of the display device.

The terms "a plurality of given views" refer to potential rendered views having different disparity directions compared to the reference view. When implementing a method of the present disclosure, one of the given views is selected so as to minimize the difference between, on one hand, the angle formed by the disparity direction with the horizontal axis and, on the other hand, the angle formed by the eyes axis with the reference axis of the 3D display device. Such a selection process is easy to compute, but may potentially lead to an outcome rendered view less adapted to the viewer's eyes orientation.

The disclosure also pertains an apparatus for determining a rendered tridimensional content intended to a viewer, comprising a module for determining a rendered view as a function of:
- a reference content comprising at least a reference view,
- at least one information related to the viewer's eyes orientation relatively to a reference axis of a display device.

One skilled in the art will understand that each of the advantageous technical features implemented on the method described here before may be implemented on the present apparatus, therefore conferring the associated technical advantages on it.

In one embodiment, the apparatus comprises at least one sensor adapted to determine the viewer's eyes orientation relatively to the reference axis of the display device.

Such a sensor may refers to dedicated glasses equipped with specific markers, gyroscopes, camera-based systems detecting the viewer face as well as its orientation, or any other technique known from the art.

In one embodiment, the apparatus comprises a stereoscopic or auto-stereoscopic displaying device to display the reference view and/or the rendered view.

An apparatus according to this embodiment may therefore be in the form of:
- head-mounted displays, virtual retinal displays,
- systems implementing a display device whose rendered content as been adapted, e.g. a monitor television or a mobile display, in association with active 3D viewers, e.g. shutter systems, or passive 3D viewers, e.g. polarization systems, interference filter systems or colour anaglyph systems,
- fixed or mobile auto stereoscopic displays embodying lenticular lenses, parallax barriers or an array of microlenses.

It is to be understood that the above list is given as a matter of illustration and does not limit the scope of the disclosure.

The disclosure also pertains a light-field capture device, comprising an apparatus for determining a rendered tridimensional content, comprising a module for determining a rendered view as a function of:
- a reference content comprising at least a reference view,
- at least one information related to the viewer's eyes orientation relatively to the reference axis of the display device.

The disclosure also pertains a computer program product downloadable from a communication network and/or recorded on a medium readable by a computer and/or executable by a processor, comprising program code instructions for implementing a method for determining a rendered tridimensional content.

The disclosure also pertains a non-transitory computer-readable carrier medium comprising a computer program product recorded thereon and capable of being run by a processor, including program code instructions for implementing a method for determining a rendered tridimensional content.

While not explicitly described, the present embodiments may be employed in any combination or sub-combination.

5. BRIEF DESCRIPTION OF THE DRAWINGS

The invention can be better understood with reference to the following description and drawings, given by way of example and not limiting the scope of protection, and in which.

The components in the figures are not necessarily to scale, emphasis instead being placed upon illustrating the principles of the disclosure.

6. DETAILED DESCRIPTION

The present disclosure relates to a method 1 for determining a rendered tridimensional content as a function of a viewer's eyes orientation θ. Many specific details of certain embodiments of the disclosure are set forth in the following description and in FIGS. 1 to 9 to provide a thorough understanding of such embodiments. It is to be understood that the present disclosure may have additional embodiments, or may be practiced without several of the details described in the following description.

Figure 4:
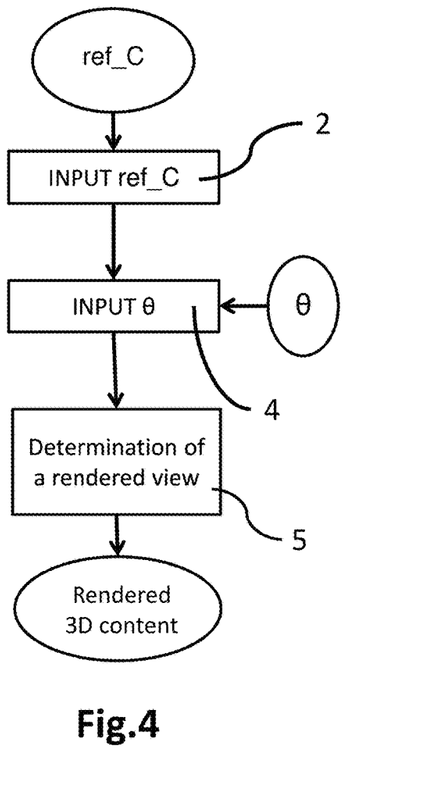
FIG. 4 is a flow chart of the successive steps implemented when performing a method for determining a rendered tridimensional content, according to one embodiment of the disclosure.

As illustrated by FIG. 4, such a method 1 comprises:

A step 2 of inputting a reference content Ref_C comprising at least a reference view 8, A step 4 of inputting at least one information related to the viewer's eyes orientation θ relatively to a reference axis X of a display device, A step 5 of determining a rendered view 6 as a function of the reference view 8, and the information related to the viewer's eyes orientation θ relatively to the reference axis X of the display device.

In the following description, the reference view 8 corresponds to the view from the viewer's left eye, also referred to as "left view", while the rendered view 6 to be determined corresponds to the view from the viewer's right eye, also referred to as "right view". In another embodiment, such a correspondence may be reverted, the viewer's right eye then seeing the reference view. In another embodiment, such views may also be allocated to any object, for instance a sensor mounted on an unmanned vehicle and connected at distance with an operator through an interface unit.

Figure 5:
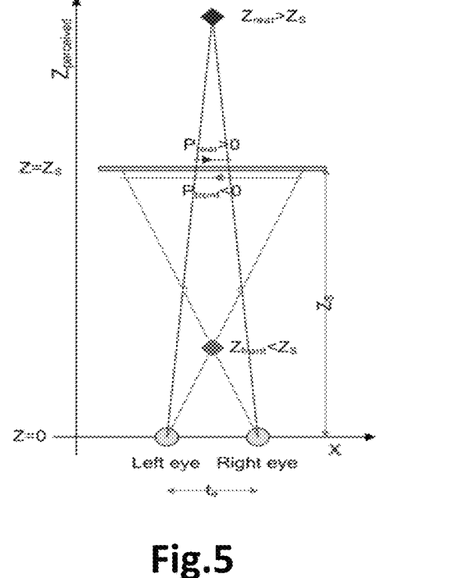
FIG. 5 is a diagram illustrating the relationship between the perceived depth and the parallax between a viewer's left and right-eye images of a stereo pair.

FIG. 5 illustrates the relationship between the perceived depth $Z_p$ and the parallax P between the viewer's left and right-eye images, where $Z_p$ is the perceived depth, $t_e$ is the interocular distance, $Z_s$ is distance from the viewer to the screen. In this way, the relationship between the perceived depth $Z_p$, the parallax P and distance $Z_s$ to the screen is expressed as followed:

$$\begin{cases} Z_p = \dfrac{Z_S \times t_e}{t_e - P} \\ P = \dfrac{W_s}{N_{col}} \times d \end{cases}$$

Where d is the transmitted disparity information, $W_s$ is the width of the screen, and $N_{col}$ is the number of pixel columns of the screen.

As a matter of illustration, three particular embodiments of the disclosure are described, each of them describing an alternative embodiment of the step 5 for determining the rendered view 6 either by a process of interpolation, or by a process of selection.

6.1. First Embodiment of the Disclosure

In a first embodiment of the disclosure, the step 5 of determining a rendered view 6 of the method 1 for determining the rendered tridimensional content including both the left view 8 and right view 6 consists in a step of interpolation.

Figure 6:
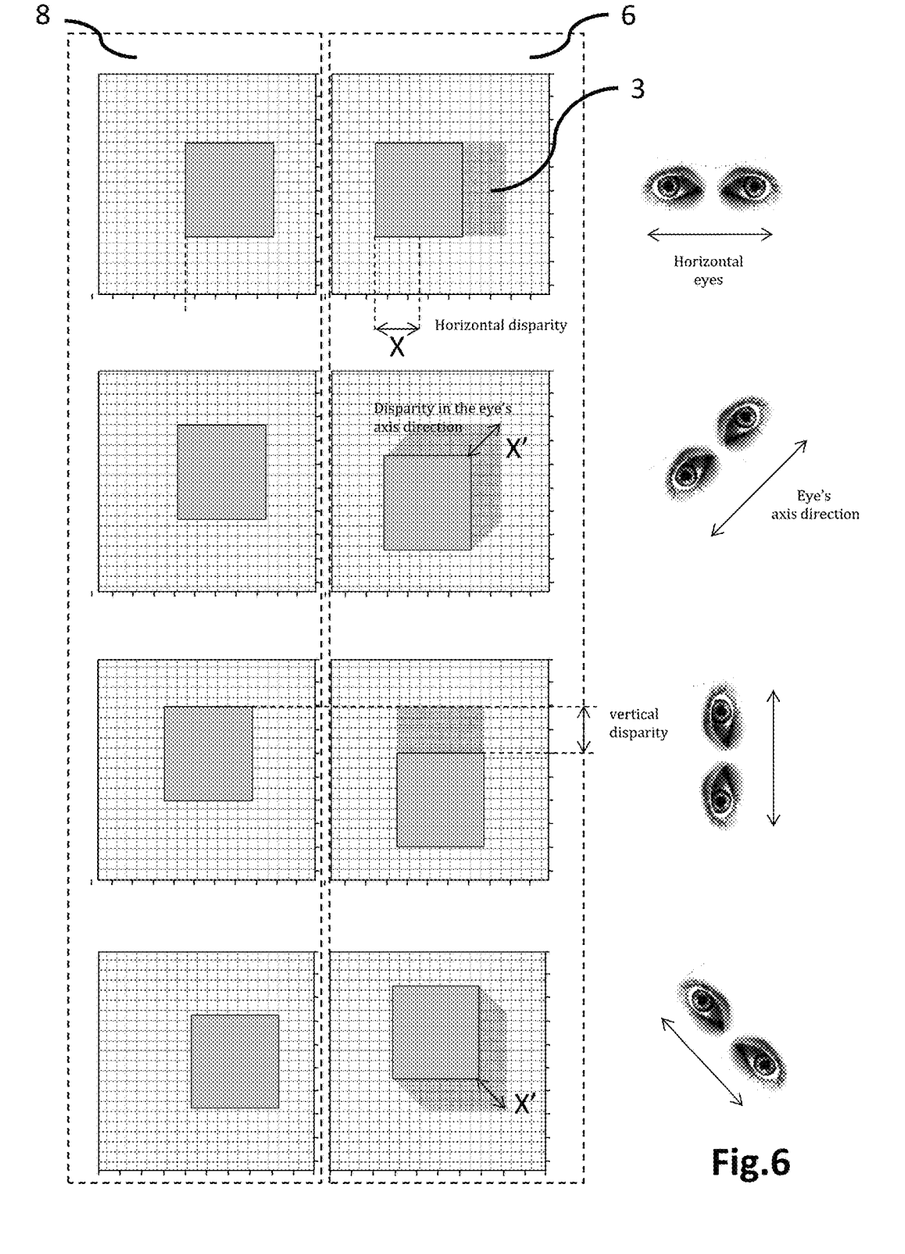
FIG. 6 is a diagram illustrating a set of left and right views depending on the axis direction of the viewer's eyes.

FIG. 6 illustrates a set of left and right views (8; 6) depending on the orientation of the axis direction of the viewer's eyes, relatively to the reference axis X of the display device. A foreground object is symbolized by a square. In this embodiment, the right view 6 is interpolated and the left view 8 is considered as a fixed reference.

The reference content Ref_C inputted in step 2 is composed of the left view 8, the corresponding depth map $Z_L$ and the occlusion map $V_O$ containing information masked in the left view but required to reconstruct the right view 6.

Since the interpolation step 5.1 depends on the orientation of the eyes axis θ, the occlusion map $V_O$ preferentially contains occlusion information in all the directions, and not only along a single tilted axis. In one embodiment, the reference content Ref_C inputted in step 2 is a light-field data, for instance a demultiplexed light-field image, which comprises the left view 8, the corresponding depth map $Z_L$ and the occlusion map $V_O$ depicting hidden portions of the foreground object in all the directions. In an other embodiment, the occlusion information may be limited to a reduced number of directions, reducing, on one hand, the size of referenced content while affecting, in the other hand, the quality of the interpolated rendered view 6. Alternatively, the data, which are occluded in the reference view 8, may be extracted from the plurality of given views 9 having different disparity directions instead of being provided in an occlusion map $Z_O$. In this case, the reference content Ref_C inputted in step 2 does not explicitly contain the occlusion map $Z_O$, but this occlusion map or equivalent is extracted from the plurality of given views 9. The position $(u_R, v_R)$ in the right view 6 of the foreground object, located at a position $(u_L, v_L)$ in the left view 8, is given by the following equation (1):

$$u_R = u_L - \frac{f^u B_{L/R}^u}{Z_L(u_L, v_L)}$$

$$v_R = v_L - \frac{f^v B_{L/R}^v}{Z_L(u_L, v_L)}$$

Where $B_{L/R}^u$ and $B_{L/R}^v$ are the horizontal and the vertical components of a baseline, $B_{L/R}^u$ being equal to $B*\cos\theta$ and $B_{L/R}^v$ being equal to $B*\sin\theta$, B being the distance between the viewer's eyes, where $Z_L(u_L, v_L)$ corresponds to the depth value at the position $(u_L, v_L)$, and where $f^u$ and $f^v$ are respectively the products of the focal length by the horizontal and the vertical density on a sensor adapted to sense the viewer's eyes orientation.

Figure 7:
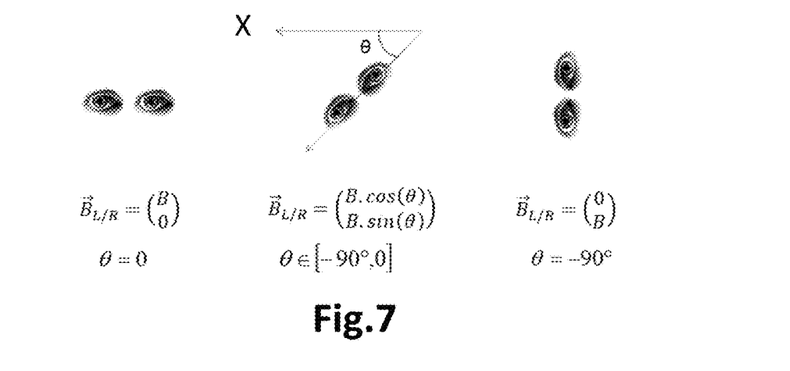
FIG. 7 is a diagram illustrating three different cases for which the angle θ between the eyes axis and the horizontal axis is in the range [−90°,+90°]

As illustrated by FIG. 7, the vector $(B_{L/R}^u, B_{L/R}^v)$ is computed from the orientation of the eye axis with respect to the reference axis X of the display device. FIG. 6 illustrates four different cases for which the angle θ between the eyes axis and the reference axis X is in the range [−90°,+90°]. A sensor mounted on the display device or on any other device may be configured to measure the angle θ or any other information that allows deducting this angle θ. For instance, dedicated glasses equipped with specific markers, gyroscopes, or camera-based systems detecting the viewer face as well as its orientation may be used as an eyes orientation sensor. Once measured, the angle θ is inputted in step 4 in the apparatus 7 implementing the method 1.

Figures 8, 9:
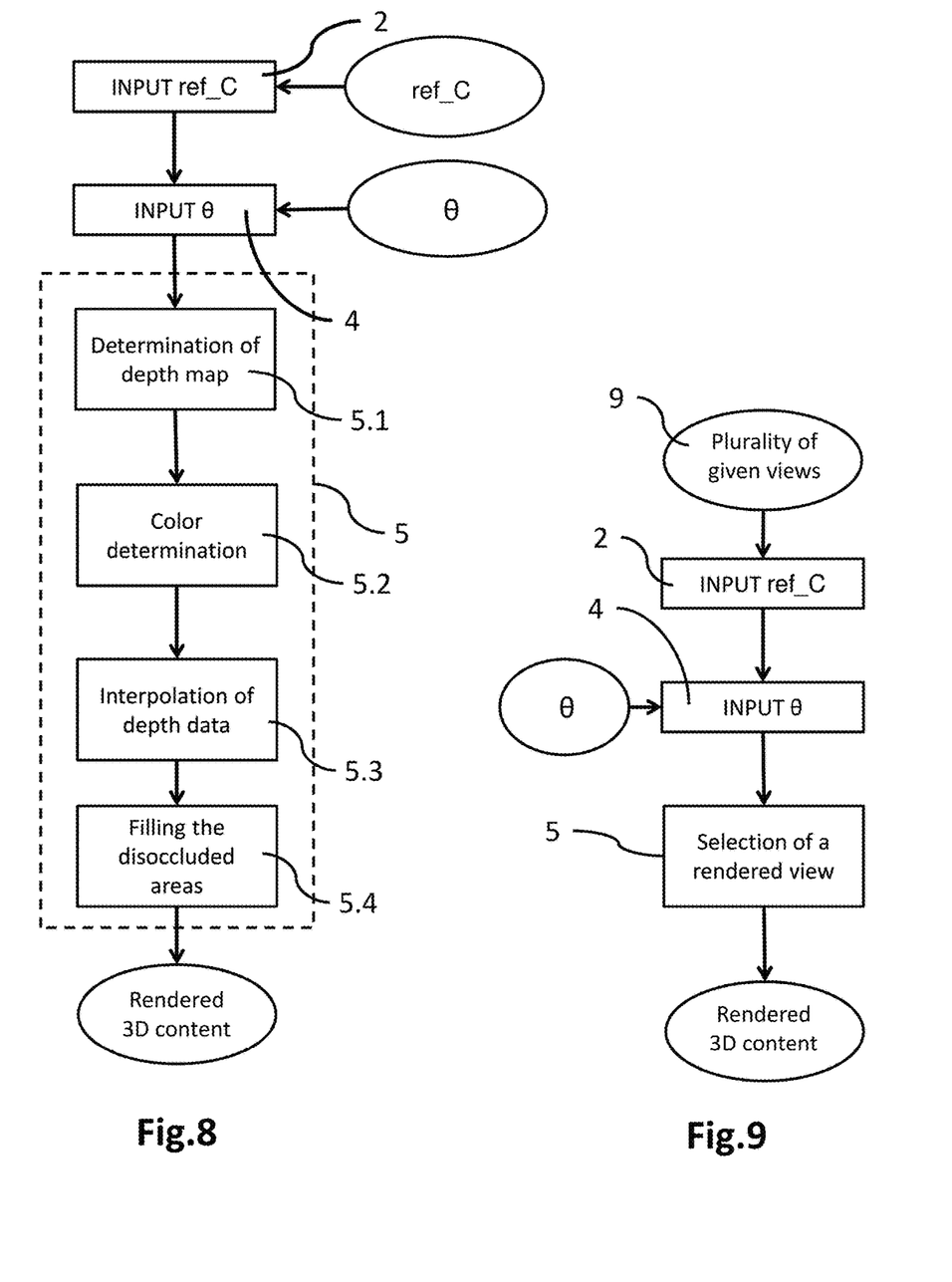
FIG. 8 is a flow chart of the successive steps implemented when performing a method for determining a rendered tridimensional content, according to the first embodiment of the disclosure.
FIG. 9 is a flow chart of the successive steps implemented when performing a method for determining a rendered tridimensional content, according to the second embodiment of the disclosure.

As illustrated by FIG. 8, and in order to run the interpolation step 5, the apparatus 7 first determines, in step 5.1, the depth map $Z_R$ of the rendered view 6 from the reference view depth map $Z_L$, or from the disparity map computed between the reference view 8 and at least a given view 9. In this way, for each pixel of the left view 8, the bidimensional (2D) location of the corresponding point is determined on the ground of the equation (1). Then, this depth value is allocated to the closest pixel in the right view based on the assumption that the depth value remains unchanged between two corresponding points, as expressed by the following equation:

$$Z_R(u_R, v_R) = Z_L(u_L, v_L)$$

Then, for each pixel of the right view 6, the apparatus 7 determines the 2D location of the corresponding point in the left view 8 via the following equations:

$$u_L = u_R + \frac{f^u B^u_{L/R}}{Z_L(u_L, v_L)}$$

$$v_L = v_R + \frac{f^v B^v_{L/R}}{Z_L(u_L, v_L)}$$

Then, the apparatus 7 determines the color of each pixel of the right view 6 from the color of the corresponding point in the left view 8 in a step 5.2.

Following the color determination step 5.2, the pixels that do not get a depth value at the end of the location determination step correspond to disoccluded areas 3, hidden in the left view. The missing depth data are then interpolated, in a step 5.3, from the neighboring available depth data from the location determination step output. The corresponding pixels in the occlusion map $V_O$ are then used, in a step 5.4, to fill these disoccluded areas 3 in the interpolated right view 6. Alternatively, when the reference content Ref_C does not comprise an occlusion map $V_O$, filling the disoccluded areas 3 in the interpolated right view 6, in step 5.4, is conducted by interpolation of the neighboring available pixels.

The combination of both the left view 8 and the right view 6 then forms a rendered tridimensional content adapted to the viewer's eyes orientation θ.

According to this embodiment, a disparity map is provided into the reference content Ref_C. However, in another embodiment, this disparity map could be computed after the inputting step 2, based on the reference view 8 and at least one given view 9. In this case, the disparity map is not mandatory in the reference content Ref_C.

6.2. Second Embodiment of the Disclosure

In a second embodiment of the disclosure, as illustrated by FIG. 9, the step 5 of determining a rendered view 6 comprises a step of selecting among a plurality of given views 9 a rendered right view 6, as a function of the viewer's eyes orientation θ relatively to the reference axis X of the display device. In this embodiment, the given views 9, as illustrated by FIG. 9, consist of a set of potential right views having different disparity directions compared to the left view 8. Each of these disparity directions forms an angle θ' with the reference axis X of the display device.

Following the input of the viewer's eyes orientation θ in step 4, the apparatus 7 is selecting one of the given views 9 so as to minimize the difference between the respective angles formed with the reference axis X by the disparity direction (angle θ') and the eyes axis (angle θ).

6.3. Third Embodiment of the Disclosure

In a third embodiment of the disclosure, the content inputted in step 2 consists in a reference view 8 and in the viewer eyes axis orientation θ relatively to the reference axis X of the display device. The viewer eyes orientation θ corresponds to the disparity direction of a rendered view 6 to determine.

According to this embodiment, a depth map $Z_L$ is first estimated as a function of the reference view 8 and the viewer eyes axis orientation θ, as described in the 2011 ICIP conference: "VISUAL PERTINENT 2D-TO-3D VIDEO CONVERSION BY MULTI-CUE FUSION", by Z. Zhang.

The rendered view 6 is then interpolated as a function of the reference view 8 and the depth map $Z_L$, as described in the description of the first embodiment of the disclosure (see paragraph 5.1).

6.4 Apparatus According to One Embodiment of the Disclosure

Figure 10:
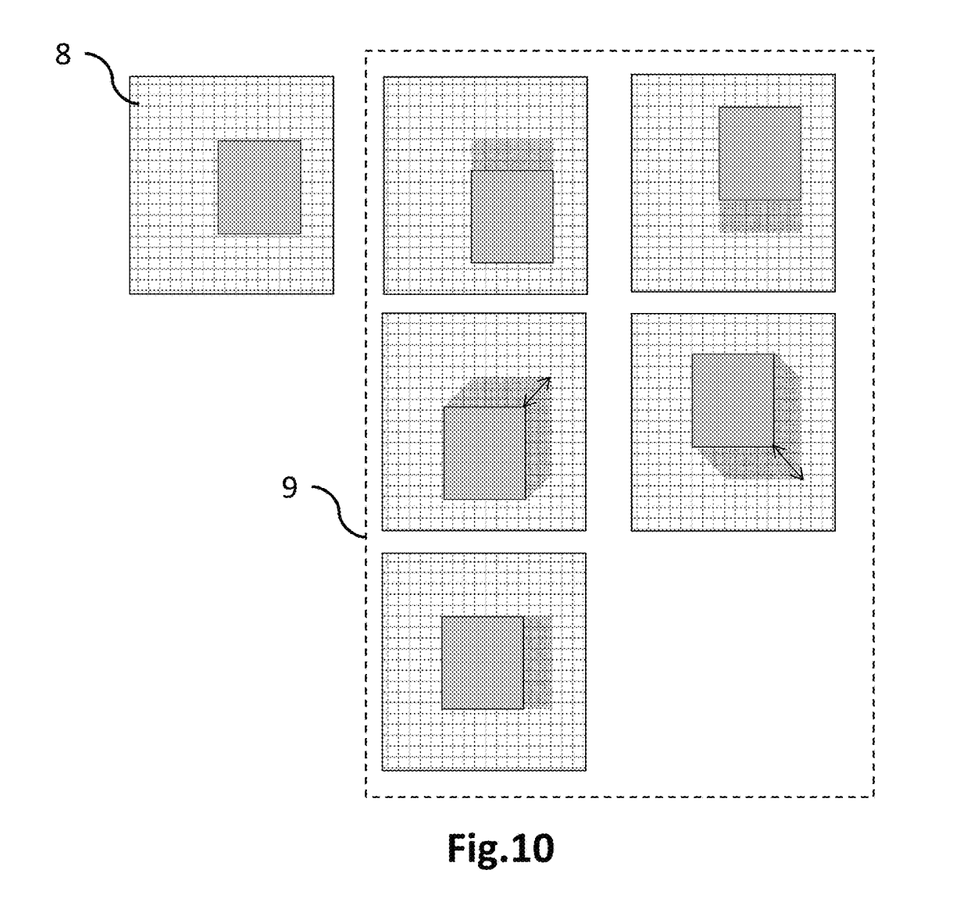
FIG. 10 is a diagram illustrating a left view and a set of given views for which the angle between the disparity direction and the horizontal axis is in the range [−90°,+90°]
Figure 11:
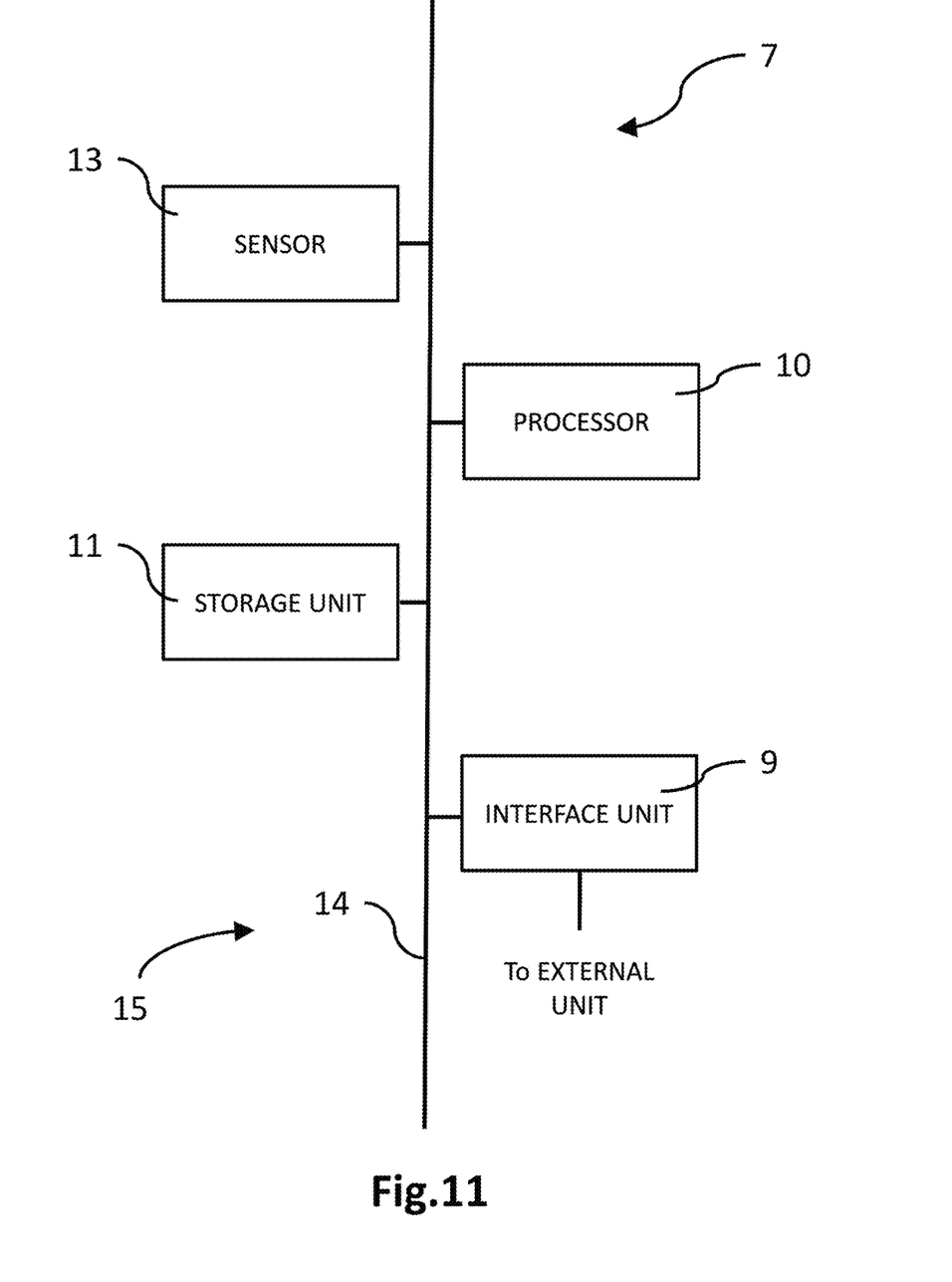
FIG. 11 is a schematic block diagram illustrating an example of an apparatus for determining a rendered tridimensional content, according to one embodiment of the present disclosure.

FIG. 10 is a schematic block diagram illustrating an example of an apparatus for determining a rendered tridimensional content, according to one embodiment of the present disclosure.

An apparatus 7 illustrated in FIG. 10 includes a processor 10, a storage unit 11, an interface unit 12 and a sensor 13, which are connected by a bus 14. Of course, constituent elements of the computer apparatus 7 may be connected by a connection other than a bus connection using the bus 14.

The processor 10 controls operations of the apparatus 7. The storage unit 11 stores at least one program to be executed by the processor 10, and various data, including data included in the reference content Ref_C, parameters used by computations performed by the processor 10, intermediate data of computations performed by the processor 10, and so on. The storage unit 11 may notably store the components of the reference content Ref_C and the viewer eyes axis orientation θ. The processor 10 may be formed by any known and suitable hardware, or software, or by a combination of hardware and software. For example, the processor 10 may be formed by dedicated hardware such as a processing circuit, or by a programmable processing unit such as a CPU (Central Processing Unit) that executes a program stored in a memory thereof.

The storage unit 11 may be formed by any suitable storage or means capable of storing the program, data, or the like in a computer-readable manner. Examples of the storage unit 11 include non-transitory computer-readable storage media such as semiconductor memory devices, and magnetic, optical, or magneto-optical recording media loaded into a read and write unit. The program causes the processor 10 to perform a process for determining a rendered tridimensional content according to an embodiment of the present disclosure as described above with reference to FIG. 4.

The interface unit 12 provides an interface between the apparatus 7 and an external apparatus. The interface unit 12 may be in communication with the external apparatus via cable or wireless communication. In this embodiment, the external apparatus may be a light-field capture device 15. In this case, light-field data can be inputted from the light-field capture device 15 to the apparatus 7 through the interface unit 12, and then stored in the storage unit 11.

The apparatus 7 and the light-field capture device 15 may communicate with each other via cable or wireless communication.

Although only one processor 10 is shown on FIG. 10, a skilled person will understand that such a processor may comprise different modules and units embodying the functions carried out by the apparatus 7 according to embodiments of the present disclosure, such as a module 16, which processes the different components of the reference content and the viewer's eyes orientation θ in order to determine 5 a rendered view 6 as a function of the viewer's eyes orientation θ relatively to the reference axis X of the display device. This module may also be embodied in several processors 10 communicating and co-operating with each other.

As will be appreciated by one skilled in the art, aspects of the present principles can be embodied as a system, method or computer readable medium. Accordingly, aspects of the present principles can take the form of an entirely hardware embodiment, an entirely software embodiment (including firmware, resident software, micro-code, and so forth), or an embodiment combining software and hardware aspects.

When the present principles are implemented by one or several hardware components, it can be noted that a hardware component comprises a processor that is an integrated circuit such as a central processing unit, and/or a microprocessor, and/or an Application-specific integrated circuit (ASIC), and/or an Application-specific instruction-set processor (ASIP), and/or a graphics processing unit (GPU), and/or a physics processing unit (PPU), and/or a digital signal processor (DSP), and/or an image processor, and/or a coprocessor, and/or a floating-point unit, and/or a network processor, and/or an audio processor, and/or a multi-core processor. Moreover, the hardware component can also comprise a baseband processor (comprising for example memory units, and a firmware) and/or radio electronic circuits (that can comprise antennas), which receive or transmit radio signals. In one embodiment, the hardware component is compliant with one or more standards such as ISO/IEC 18092/ECMA-340, ISO/IEC 21481/ECMA-352, GSMA, StoLPaN, ETSI/SCP (Smart Card Platform), GlobalPlatform (i.e. a secure element). In a variant, the hardware component is a Radio-frequency identification (RFID) tag. In one embodiment, a hardware component comprises circuits that enable Bluetooth communications, and/or Wi-fi communications, and/or Zigbee communications, and/or USB communications and/or Firewire communications and/or NFC (for Near Field) communications.

Furthermore, aspects of the present principles can take the form of a computer readable storage medium. Any combination of one or more computer readable storage medium(s) may be utilized.

Thus for example, it will be appreciated that any flow charts, flow diagrams, state transition diagrams, pseudo code, and the like represent various processes which may be substantially represented in computer readable storage media and so executed by a computer or a processor, whether or not such computer or processor is explicitly shown.

Although the present disclosure has been described with reference to one or more examples, a skilled person will recognize that changes may be made in form and detail without departing from the scope of the disclosure and/or the appended claims.

The invention claimed is:

1. A method for determining a rendered tri-dimensional content intended to a viewer, comprising:
   inputting a reference content comprising at least a reference view corresponding to the view from the viewer's left or right eye,
   inputting at least one information related to the viewer's eyes axis orientation relatively to a reference axis of a display device, where said viewer's eyes axis orientation can include axes other than horizontal,
   determining a rendered view as a function of the reference view and the information related to the viewer's eyes axis orientation relatively to the reference axis of the display device, said rendered view corresponding to a view from the other of the viewer's left or right eye,
   generating the rendered tri-dimensional content by combining the reference view and the rendered view.

2. The method according to claim 1, wherein:
   the reference content comprises a depth map ($Z_L$) depicting depth in the reference view, or information on the disparity between at least one given view and the reference view, or the at least one given view,
   determining the rendered view is also a function of the depth map ($Z_L$) or the information on disparity, or the at least one given view.

3. The method according to claim 2, wherein:
   the reference content comprises occlusion information ($V_O$) on a hidden portion of the reference view along at least one tilted axis forming an angle with the reference axis of the display device,
   determining the rendered view is also a function of the occlusion information ($V_O$).

4. The method according to claim 3, wherein the occlusion information ($V_O$) pertain to a hidden portion of the reference view along at least two tilted axis forming an angle with the reference axis of the display device.

5. The method according to claim 4, wherein determining consists in interpolating as a function of the reference view, the depth map ($Z_L$) or the information on disparity, the occlusion information ($V_O$), and the information related to the viewer's eyes axis orientation relatively to the reference axis of the display device.

6. The method according to claim 5, wherein interpolating comprises:
   determining a depth map ($Z_R$) of the rendered view from the reference view depth map ($Z_L$),
   determining a hidden portion of the reference view based on the occlusion map information ($V_O$).

7. The method according to claim 6, wherein interpolating comprises determining the color of each pixel of the rendered view based on the color of the corresponding pixel in the reference view.

8. The method according to claim 3, wherein:
   the reference content comprises a plurality of given views,
   determining consists in selecting among the given views the rendered view, as a function of the reference content and the information related to the viewer's eyes axis orientation relatively to the reference axis of the display device.

9. The method according to claim 1,
   wherein a position ($u_R,v_R$) in the rendered view of an object located at a position ($u_L,v_L$) in the reference view is given by:

$$u_R = u_L - \frac{f^u B_{L/R}^u}{Z_L(u_L, v_L)}$$

$$v_R = v_L - \frac{f^v B_{L/R}^v}{Z_L(u_L, v_L)}$$

where $B_{L/R}^u$ and $B_{L/R}^u$ are the horizontal and the vertical components of a baseline vector, $B_{L/R}^u$ being equal to B*cos θ and $B_{L/R}^v$ being equal to B*sin θ, B being the distance between the viewer's eyes,
where $Z_L(u_L,v_L)$ corresponds to a depth value at the position ($u_L,v_L$),
where θ is the at least one information related to the viewers eyes axis orientation relative to the reference axis of the display device, and
where f$^u$ and f$^v$ are respectively the products of a focal length by the horizontal and the vertical density on a sensor adapted to sense the viewer's eyes axis orientation.

10. The method according to claim 9, wherein the reference content comprises light-field data.

11. A non-transitory computer-readable carrier medium comprising a computer program product recorded thereon and capable of being run by a processor, including program code instructions for implementing the method according to claim 1.

12. An apparatus for determining a rendered tri-dimensional content intended to a viewer, comprising a module for determining a rendered view corresponding to a view from one of the viewer's eyes as a function of:
- a reference content comprising at least a reference view corresponding to a view from the other of the viewer's eyes,
- at least one information related to the viewer's eyes axis orientation relatively to a reference axis of a display device, wherein said viewer's eyes axis orientation can include axes other than horizontal.

13. The apparatus according to claim 12, comprising at least one sensor adapted to determine the viewer's eyes axis orientation relatively to the reference axis of the display device.

14. A light-field capture device, comprising an apparatus for determining a rendered tri-dimensional content, comprising a module for determining a rendered view corresponding to view from one of the viewer's eyes as a function of:
- a reference content comprising at least a reference view corresponding to a view from the other of the viewer's eyes,
- at least one information related to the viewer's eyes axis orientation relatively to a reference axis of a display device, wherein said viewer's eyes axis orientation can include axes other than horizontal.

* * * * *

UNITED STATES PATENT AND TRADEMARK OFFICE
CERTIFICATE OF CORRECTION

| | |
|---|---|
| PATENT NO. | : 10,354,435 B2 |
| APPLICATION NO. | : 15/389394 |
| DATED | : July 16, 2019 |
| INVENTOR(S) | : Sylvain Thiebaud, Didier Doyen and Philippe Robert |

It is certified that error appears in the above-identified patent and that said Letters Patent is hereby corrected as shown below:

In the Claims

1. At Column 12, Line 48, in Claim 9, replace "$B_{L/R}^{u}$" with --$B_{L/R}^{v}$--

2. At Column 12, Line 55, Claim 9, replace "viewers" with --viewer's--

Signed and Sealed this
Nineteenth Day of November, 2024

Katherine Kelly Vidal
*Director of the United States Patent and Trademark Office*